US012651613B2

(12) United States Patent
Werner et al.

(10) Patent No.: US 12,651,613 B2
(45) Date of Patent: Jun. 9, 2026

(54) DYNAMIC PLAYBACK SPEED ADJUSTMENT

(71) Applicant: International Business Machines Corporation, Armonk, NY (US)

(72) Inventors: John S. Werner, Fishkill, NY (US); Brian Fernandez, Poughkeepsie, NY (US); Philip David Atwood, Poughkeepsie, NY (US); Abraham Mitchell, Saint Albans, NY (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 18/060,594

(22) Filed: Dec. 1, 2022

(65) Prior Publication Data

US 2024/0185887 A1     Jun. 6, 2024

(51) Int. Cl.
| | |
|---|---|
| *H04N 21/84* | (2011.01) |
| *G11B 27/00* | (2006.01) |
| *H04N 21/45* | (2011.01) |
| *H04N 21/845* | (2011.01) |
| *H04N 5/78* | (2006.01) |
| *H04N 21/23* | (2011.01) |

(52) U.S. Cl.
CPC ....... *G11B 27/005* (2013.01); *H04N 21/4532* (2013.01); *H04N 21/8456* (2013.01); *H04N 5/78* (2013.01)

(58) Field of Classification Search
CPC ........... H04N 21/84; H04N 2201/3276; H04N 2201/00; H04N 21/23; H04N 21/00
USPC .......................... 386/262, 239, 248, 282, 278
See application file for complete search history.

(56) References Cited

U.S. PATENT DOCUMENTS

| | | | |
|---|---|---|---|
| 5,664,044 | A | 9/1997 | Ware |
| 6,338,038 | B1 | 1/2002 | Hanson |

(Continued)

FOREIGN PATENT DOCUMENTS

| | | |
|---|---|---|
| CN | 101047844 A | 10/2007 |
| CN | 101583025 B | 5/2011 |

(Continued)

OTHER PUBLICATIONS

Almousa et al., "NLP-Enriched Automatic Video Segmentation", Conference: 2018 6th International Conference on Multimedia Computing and Systems (ICMCS), May 2018, 7 Pages.

*Primary Examiner* — Daquan Zhao
(74) *Attorney, Agent, or Firm* — Aaron N. Pontikos

(57) ABSTRACT

In an approach to playback speed adjustment, one or more computer processors extract metadata from a media file previously consumed by a user. One or more computer processors determine the metadata includes an eigenvector associated with each segment of the media file. One or more computer processors import data associated with actions taken by the user while the user consumed the media file. Based on the data associated with the actions taken by the user while the user consumed the media file, one or more computer processors extract the eigenvector and an associated eigenvalue of each previously consumed segment of the media file from the data associated with actions taken by the user while the user consumed the media file. One or more computer processors add the eigenvector and the associated eigenvalue of each previously consumed segment of the media file to a user profile.

20 Claims, 5 Drawing Sheets

(56) References Cited

U.S. PATENT DOCUMENTS

| | | | |
|---|---|---|---|
| 6,665,751 | B1 | 12/2003 | Chen |
| 6,967,599 | B2 | 11/2005 | Choi |
| 7,676,142 | B1 | 3/2010 | Hung |
| 8,050,541 | B2 | 11/2011 | Gilbert |
| 9,767,825 | B2 | 9/2017 | Watts |
| 10,250,925 | B2 | 4/2019 | Agrawal |
| 11,017,811 | B1 | 5/2021 | Li |
| 2016/0110761 | A1* | 4/2016 | Ioannidis ........... G06Q 30/0255 705/14.53 |
| 2017/0142222 | A1* | 5/2017 | Libow ................... H04L 67/535 |
| 2020/0097500 | A1* | 3/2020 | Breaux ................. G06F 16/635 |

FOREIGN PATENT DOCUMENTS

| | | | |
|---|---|---|---|
| CN | 105165013 | B | 12/2015 |
| JP | 4509188 | B2 | 7/2008 |
| WO | 2010142178 | A1 | 12/2010 |

* cited by examiner

DYNAMIC PLAYBACK SPEED ADJUSTMENT

BACKGROUND OF THE INVENTION

The present invention relates generally to the field of artificial intelligence, and more particularly to dynamic playback speed adjustment.

The study and development of artificial intelligence (AI) systems aim at building computer systems able to perform tasks that normally require human intelligence. AI-based machines are intended to perceive their environment and take actions that optimize their level of success. AI research uses techniques from many fields, such as computer science, philosophy, linguistics, economics, speech recognition, and psychology, which are manifested in applications, such as control systems, natural language processing (NLP), facial recognition, speech recognition, analytics, pattern matching, data mining, and logistics. Cognitive computing is among the subdisciplines that shape AI, focusing on putting together a system that combines the best of human and machine capabilities. Cognitive computing uses machine strengths to "simulate" the human thought processes in a computerized model.

In some applications, a user may be able to adjust the playback speed of media the user is consuming, such as a video or podcast, if the user feels the presentation in the media is moving too fast or too slowly. The user can choose a multiplier of the current presentation speed, where the current presentation speed is considered "1," and the multiplier may be, for example, "2×" which means to play the media at twice the current speed, or, in another example, the multiplier may be "0.5" which means to play the media at half the current speed. Changing the playback speed does not change the pitch of the media when sped up or slowed down. Instead, it compresses or expands the audio and video samples to maintain the same audio pitch during playback.

Eigenvalues and eigenvectors are concepts used in a popular dimensionality reduction technique called Principal Component Analysis (PCA). In PCA, these concepts help in reducing the dimensionality of the data resulting in a simpler model, which is computationally efficient and provides greater generalization accuracy. When applied to various types of media, the eigenvector and corresponding eigenvalue reduce the dimensionality of a media segment by creating a multidimensional vector of principal components, such as talking speed, occurrences of tokens within audio or video data, visual recognition of items within video, correlation between groups of tokens, etc., that characterize the media segment while retaining most of the original information. Eigenvectors and eigenvalues can be easily compared to determine if two pieces of media are discussing the same topic, which would be difficult if one were to simply compare only the unstructured text from the media files.

SUMMARY

Embodiments of the present invention disclose a computer-implemented method, a computer program product, and a system for playback speed adjustment. The computer-implemented method may include one or more computer processors extracting metadata from a media file previously consumed by a user. One or more computer processors determine the metadata includes an eigenvector associated with each segment of the media file. One or more computer processors import data associated with actions taken by the user while the user consumed the media file. Based on the data associated with the actions taken by the user while the user consumed the media file, one or more computer processors extract the eigenvector and an associated eigenvalue of each previously consumed segment of the media file from the data associated with actions taken by the user while the user consumed the media file. One or more computer processors add the eigenvector and the associated eigenvalue of each previously consumed segment of the media file to a user profile.

DETAILED DESCRIPTION

When consuming educational media, for example, recorded video, podcasts, or meeting recordings, a user may determine that a portion of the content is repeated, i.e., the user has previously consumed that content. Due to hectic schedules and limited time to consume content, the user prefers not to waste time consuming content with which the user is already familiar. To prevent wasting time, the user may skip portions of the media to find content that is new and/or relevant. By skipping a portion of the content, the user may inadvertently miss important information or information the user has not consumed in the past. Alternatively, the user may choose to increase the playback speed of the previously consumed media, which may also lead to the user missing important information or information the user has not consumed in the past due to the speed of the playback interfering with the user's comprehension of the media. In another scenario, the user may adjust the playback speed based on the talking speed of the presenter within the media if the user determines that the presenter is speaking too fast or too slowly.

Embodiments of the present invention recognize that efficiency may be gained by providing an artificially intelligent (AI) system that dynamically adjusts playback speed throughout a piece of media in order to save time for the user by speeding up the playback of portions of the media with which the user is already familiar. Embodiments of the present invention track the consumption of media to update a user profile, then use the profile to determine appropriate playback speeds of various new media. Embodiments of the present invention also recognize when a user is unfamiliar with the content of a piece of media based on user history of content consumption and adjust the playback speed accordingly. Implementation of embodiments of the invention may take a variety of forms, and exemplary implementation details are discussed subsequently with reference to the Figures.

Figure 1:
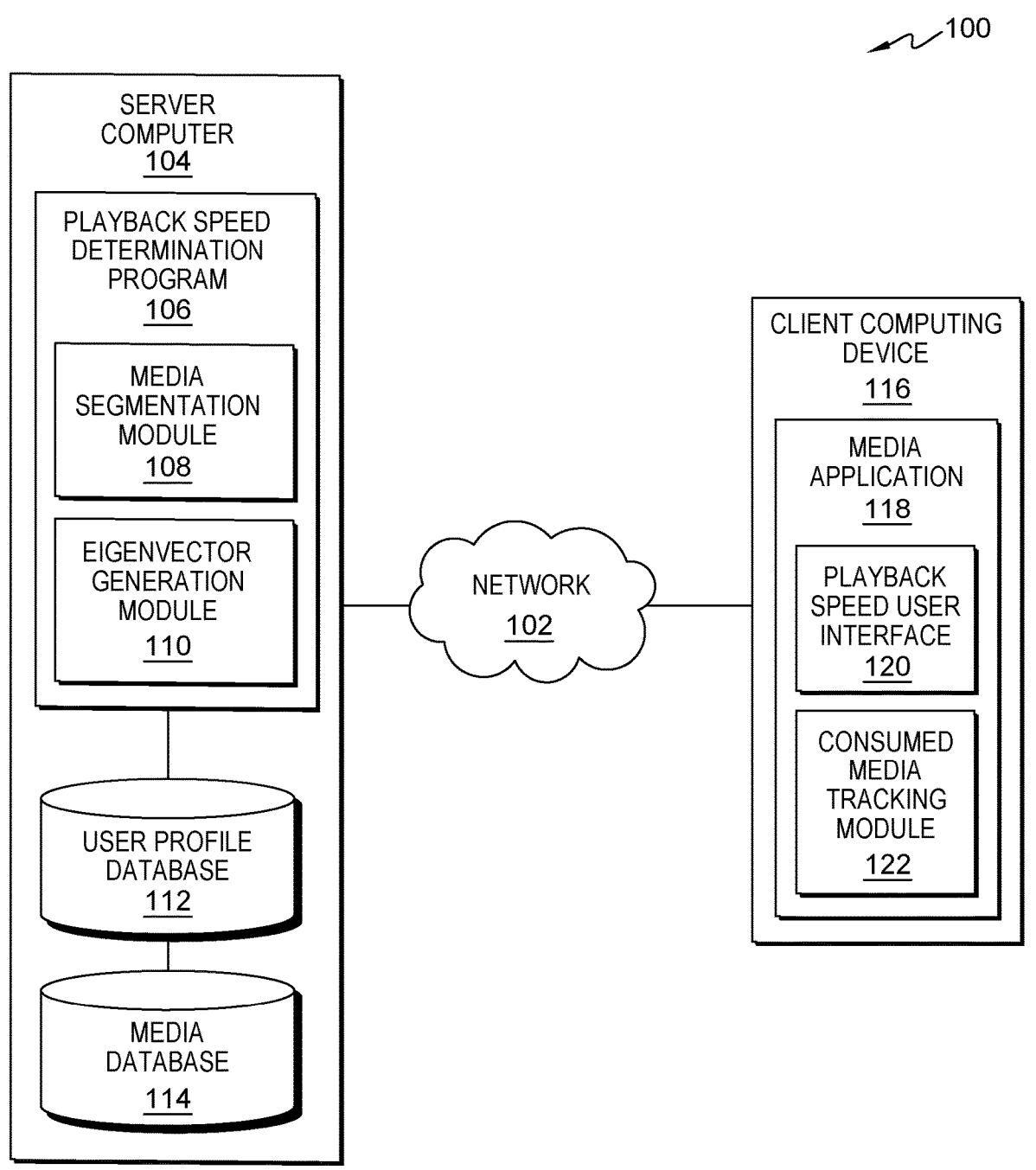
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 116 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 116, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, an edge device, a containerized workload, or any programmable electronic device capable of communicating with client computing device 116 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes playback speed determination program 106, user profile database 112, and media database 114. Server computer 104 may include internal and external hardware components, as depicted and described in further detail with respect to FIG. 5.

Playback speed determination program 106 tracks a user's behavior while the user consumes various types and categories of media and updates a user profile with the media consumption information and user preferences. Playback speed determination program 106 compares eigenvectors within the user's profile to eigenvectors in the media that the user is about to consume to determine a playback speed to use for each segment within the media. Then, as the user consumes new media, playback speed determination program 106 dynamically adjusts playback speed throughout the new media based on the user history of previously consumed media. In the depicted embodiment, playback speed determination program 106 is a stand-alone program that resides on server computer 104. In another embodiment, playback speed determination program 106 may be integrated into a media application, such as media application 118, that resides on client computing device 116.

After a user selects a piece of media to consume, playback speed determination program 106 extracts metadata from the media file prior to user consumption and determines whether the metadata includes eigenvectors. If playback speed determination program 106 determines the metadata does not include eigenvectors, then playback speed determination program 106 imports the full media file, divides the media file into segments using media segmentation module 108, and extracts a segment. Playback speed determination program 106 generates an eigenvector and an eigenvalue associated with the segment using eigenvector generation module 110, as will be discussed in further detail with respect to FIG. 3. Playback speed determination program 106 iteratively repeats this process until playback speed determination program 106 has generated eigenvectors and eigenvalues for all segments of the media file, then playback speed determination program 106 adds the generated eigenvectors and eigenvalues to the metadata of the full media file. If playback speed determination program 106 determines the metadata does include eigenvectors, then playback speed determination program 106 imports consumed media data and extracts eigenvectors and eigenvalues associated with consumed segments such that playback speed determination program 106 selects playback speeds for each segment specific to the user that is about to consume the media. Playback speed determination program 106 adds the extracted eigenvectors and eigenvalues of consumed segments to the user profile.

Subsequently, playback speed determination program 106 receives a new media selection in a media application from a user. Playback speed determination program 106 extracts segment metadata from the new media. Playback speed determination program 106 selects a segment. Playback speed determination program 106 extracts an eigenvector for the segment from the segment metadata. Playback speed determination program 106 compares the extracted eigenvector to a user profile and determines whether a match is found. If playback speed determination program 106 finds a match, then playback speed determination program 106 extracts the associated eigenvalue from the user profile and determines the playback speed based on the eigenvalue and the actual talking speed in the segment of the media. If playback speed determination program 106 does not find a match, then playback speed determination program 106 determines the playback speed based on the preferred talking speed of the user for the type of content within the media segment. Responsive to determining the playback speed of the segment, playback speed determination program 106 updates a playback file. Playback speed determination program 106 iteratively repeats the process for each segment of the media and transmits the playback file to the media application. Playback speed determination program 106 includes media segmentation module 108 and eigenvector generation module 110. Playback speed determination program 106 is depicted and described in further detail with respect to FIG. 2 and FIG. 4.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails and texts begin with a written notification that the user's information may be recorded or monitored and may be saved, for the purpose of tracking media consumption. These embodiments may also include periodic reminders of such recording and monitoring throughout the course of any such use. Certain embodiments may also include regular (e.g., daily, weekly, monthly) reminders to the participating parties that they have consented to being recorded and monitored for tracking media consumption and may provide the participating parties with the opportunity to opt-out of such recording and monitoring if desired.

In the depicted embodiment, media segmentation module 108 is a component of playback speed determination program 106. In another embodiment, media segmentation module 108 may be a stand-alone program within distributed data processing environment 100, provided that playback speed determination program 106 can access media segmentation module 108. In another embodiment, the function of media segmentation module 108 may be fully integrated into playback speed determination program 106. Media segmentation module 108 divides a media file into smaller segments. In an embodiment, media segmentation module 108 extracts segments from a media file that was previously manually segmented by the media creator. For example, a one-hour course may contain five parts of varying length. In another embodiment, media segmentation module 108 treats each sentence spoken within a media file as a segment and divides the media file into individual sentences. In yet another embodiment, media segmentation module 108 uses one or more natural language processing (NLP) techniques to automatically segment the media file. In an embodiment, media segmentation module 108 performs the segmentation of a media file once and stores the result in media database 114 in association with the metadata of the media file.

In the depicted embodiment, eigenvector generation module 110 is a component of playback speed determination program 106. In another embodiment, eigenvector generation module 110 may be a stand-alone program within distributed data processing environment 100, provided that playback speed determination program 106 can access eigenvector generation module 110. In another embodiment, the function of eigenvector generation module 110 may be fully integrated into playback speed determination program 106. In yet another embodiment, eigenvector generation module 110 is a subroutine of playback speed determination program 106. Eigenvector generation module 110 analyzes a segment of media to generate a multidimensional unit vector, i.e., an eigenvector, for a given segment of media, and a scaler, i.e., an eigenvalue. For example, a student may watch two videos attempting to learn a new concept from science class. The two videos may describe the concept in very different ways, but ultimately describe the same thing. By extracting the principal components from each video into their own eigenvectors and eigenvalues, the videos can be more easily compared to make the determination that they cover the same topic. After seeing many videos covering the topic, the student is likely more familiar with the concept such that new videos with similar eigenvectors and eigenvalues can be recognized as matching the student's profile and therefore played at a faster rate. Eigenvector generation module 110 converts the media segment extracted by playback speed determination program 106 into unstructured text with timestamps. Eigenvector generation module 110 generates weights. Eigenvector generation module 110 performs supervised learning on the text. Eigenvector generation module 110 cleanses the text data. Eigenvector generation module 110 generates an eigenvector and eigenvalue for the segment. Eigenvector generation module 110 is depicted and described in further detail with respect to FIG. 3.

In the depicted embodiment, user profile database 112 and media database 114 reside on server computer 104. In another embodiment, one or both of user profile database 112 and media database 114 may reside elsewhere within distributed data processing environment 100, provided that playback speed determination program 106 and media application 118 have access to user profile database 112 and media database 114, via network 102. A database is an organized collection of data. User profile database 112 and media database 114 can each be implemented with any type of storage device capable of storing data and configuration files that can be accessed and utilized by playback speed determination program 106 and media application 118, such as a database server, a hard disk drive, or a flash memory.

User profile database 112 stores information used by and generated by playback speed determination program 106. Information used by playback speed determination program 106 includes, but is not limited to, media previously consumed by the user including metadata associated with the consumption of the data. For example, user profile database 112 may store identification of segments of a media file previously consumed by the user, as well as the playback speed at which the user consumed each segment of the media file, a topic or category associated with the media file, etc. User profile database 112 also stores eigenvectors and associated eigenvalues for each segment of each media file consumed by the user. Further, user profile database 112 stores data associated with the user, including, but not limited to, the name of the user, an address, an email address, a voice sample, a phone number, a credit card number, an account number, an employer, a job role, a job family, a business unit association, a job seniority, a job level, a resume, a medical record, a social network affiliation, an education level, an education history, one or more degrees held by the user, etc. User profile database 112 may also store additional data associated with the user, such as content generated by the user, for example, emails, messages, presentations, documents, videos, podcasts, media file, etc. User profile database 112 may also store user preferences input directly by the user into user profile database 112 or learned over time from previously consumed media for playback speeds based on, for example, an actual talking speed of the speaker, an accent of the speaker, the native language of the user, etc. Playback speed determination program 106 may use the data associated with the user for eigenvector weighting, as will be discussed with respect to FIG. 3. User profile database 112 may also store an employer directory.

Media database 114 stores various media files available for consumption by the user of client computing device 116 via media application 118. Media files may include, but are not limited to, text files, still images, video clips, audio clips, podcasts, meeting recordings, etc. Media database 114 also stores metadata associated with the stored media files. Metadata may include, but is not limited to, comments, a summary of the file, timestamps associated with the beginning and end of the file, segmentation of the file as performed by media segmentation module 108, timestamps associated with the beginning and end of each segment of the file, a title of each segment of the file, eigenvectors and associated eigenvalues of each segment of the file as generated by eigenvector generation module 110, etc.

The present invention may contain various accessible data sources, such as user profile database 112 and media database 114, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Playback speed determination program 106 enables the authorized and secure processing of personal data. Playback speed determination program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Playback speed determination program 106 provides information regarding personal data and the nature (e.g., type, scope, purpose, duration, etc.) of the processing. Playback speed determination program 106 provides the user with copies of stored personal data. Playback speed determination program 106 allows the correction or completion of incorrect or incomplete personal data. Playback speed determination program 106 allows the immediate deletion of personal data.

Client computing device 116 can be one or more of a laptop computer, a tablet computer, a smart phone, smart watch, a smart speaker, or any programmable electronic device capable of communicating with various components and devices within distributed data processing environment 100, via network 102. Client computing device 116 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In an embodiment, the wearable computer may be in the form of a smart watch. In one embodiment, the wearable computer may be in the form of a head mounted display (HMD). The HMD may take the form-factor of a pair of glasses, such as augmented reality (AR) glasses, which is a device for viewing mixed reality and/or augmented reality scenarios. In the embodiment where the HMD is a pair of AR glasses, the AR glasses can capture eye gaze information from a gaze point tracker, such as a camera associated with client computing device 116. In general, client computing device 116 represents one or more programmable electronic devices or combination of programmable electronic devices capable of executing machine readable program instructions and communicating with other computing devices (not shown) within distributed data processing environment 100 via a network, such as network 102. Client computing device 116 includes media application 118.

In an embodiment, media application 118 is one or more of a plurality of video and/or audio streaming services that enable a user to select and consume media files, such as videos, podcasts, music, etc. In another embodiment, media application 118 is one or more of a plurality of educational services that provide remote learning. In yet another embodiment, media application 118 is one or more of a plurality of web meeting software that enables recording of a meeting and provides the video and/or audio recording to a user for replay at a later time. Media application 118 includes an instance of playback speed user interface 120 and consumed media tracking module 122.

Playback speed user interface 120 provides an interface between playback speed determination program 106 on server computer 104 and a user of client computing device 116. In one embodiment, playback speed user interface 120 is mobile application software. Mobile application software, or an "app," is a computer program designed to run on smart phones, tablet computers and other mobile devices. In one embodiment, playback speed user interface 120 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In an embodiment, playback speed user interface 120 enables a user of client computing device 116 to input data to be included in a user profile stored in user profile database 112. For example, playback speed user interface 120 enables a user of client computing device 116 to input user preferences for playback speeds based on, for example, an actual talking speed of the speaker, an accent of the speaker, the native language of the user, etc. In an embodiment, playback speed user interface 120 enables the user to interact with media files from media database 114, displayed by media application 118. For example, playback speed user interface 120 enables the user to fast forward, rewind, skip portions of the media, increase the playback speed, decrease the playback speed, etc.

Consumed media tracking module 122 tracks user activity while the user consumes media and, once the user's consumption of the data is complete, generates consumed media data that describes the user activity that playback speed determination program 106 uses as supervised learning input. For example, consumed media tracking module 122 may track any actions taken by the user in playback speed user interface 120. Tracked user activity may include, but is not limited to, alterations to the playback speed made by the user, i.e., increasing or decreasing the playback speed, whether the user consumed all segments of the media file, or only a subset, whether the user repeated the consumption of a segment or a portion of a segment, whether the user skipped a portion of a segment, etc. In an embodiment, consumed media tracking module 122 also tracks user activity that indicates the attention paid by the user to the media while the user consumes the media. For example, consumed media tracking module 122 may use an eye tracking device (not shown in FIG. 1) to determine whether the user was paying attention to another application, such as answering emails, while the media file was playing. In another example, consumed media tracking module 122 may detect physical activity measured on a smart watch and/or other wearable device worn by the user, and/or via a camera in proximity to the user (not shown in FIG. 1) to determine whether the user was exercising or performing other physical tasks while the media file was playing. In an embodiment, consumed media tracking module 122 uses one or more application programming interfaces (API) to retrieve the user activity data. In an embodiment, the output of consumed media tracking module 122, i.e., consumed media data, is a modified version of the media file that matches the user actions. In another embodiment, the consumed media data may be a text file. In either embodiment, the consumed media data contains information such as exactly which portions of the media content were consumed, i.e., viewed and/or listened to, the playback speed, whether the user consumed any portion of the content more than once, etc. Consumed media tracking module 122 provides the user activity data to playback speed determination program 106 for use in determining which eigenvectors and eigenvalues to store in the user profile. In an embodiment, consumed media tracking module 122 stores the consumed media data in user profile database 112. In an embodiment, consumed media tracking module 122 stores the consumed media data as metadata associated with the media file. In an embodiment, the user of client computing device 116 opts in to having consumed media tracking module 122 track the activity of the user.

Figure 2:
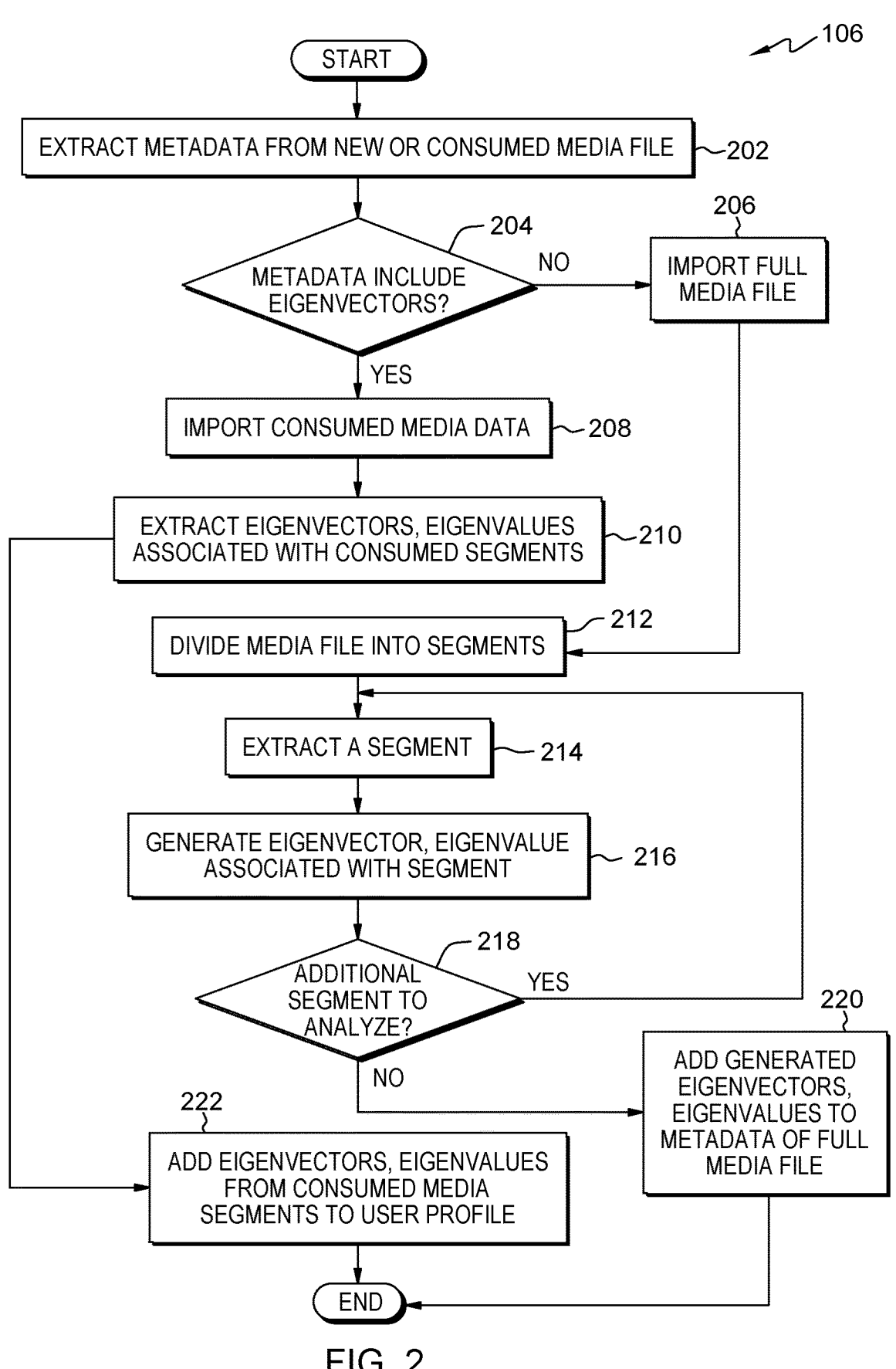
FIG. 2 is a flowchart depicting operational steps of a playback speed determination program, on a server computer within the distributed data processing environment of FIG. 1, for analyzing a media file for a presence of eigenvectors and associated eigenvalues and updating a user profile, in accordance with an embodiment of the present invention.

FIG. 2 is a flowchart depicting operational steps of playback speed determination program 106, on server computer 104 within distributed data processing environment 100 of FIG. 1, for analyzing a media file for a presence of eigenvectors and associated eigenvalues and updating a user profile, in accordance with an embodiment of the present invention.

Playback speed determination program 106 extracts metadata from a new or consumed media file (step 202). In an embodiment, once a user has consumed a media file stored in media database 114, playback speed determination program 106 extracts metadata associated with the consumed media file from media database 114. As discussed earlier, metadata may include, but is not limited to, comments, a summary of the file, timestamps associated with the beginning and end of the file, segmentation of the file, timestamps associated with the beginning and end of each segment of the file, a title of each segment of the file, as well as eigenvectors and associated eigenvalues of each segment of the file.

Playback speed determination program 106 determines whether the metadata includes eigenvectors (decision block 204). Typically, when a piece of media is first uploaded to media database 114, the metadata associated with the media file does not include eigenvectors. However, when a user selects a media file to consume from media database 114, the metadata associated with the media file typically does include eigenvectors. In an embodiment, playback speed determination program 106 analyzes the extracted metadata to determine whether the metadata includes one or more eigenvectors associated with the consumed media file.

If playback speed determination program 106 determines the metadata does not include eigenvectors ("no" branch, decision block 204), then playback speed determination program 106 imports the full media file (step 206). In an embodiment, if playback speed determination program 106 determines that the metadata associated with the consumed media file does not include one or more eigenvectors, then playback speed determination program 106 imports the full media file from media database 114 for further processing.

Playback speed determination program 106 divides the media file into segments (step 212). In an embodiment, playback speed determination program 106 uses media segmentation module 108 to divide the full media file into appropriate segments. For example, if the media file is a recording of a meeting, then media segmentation module 108 may make each separate presentation into a segment. In an embodiment where the function of media segmentation module 108 is fully integrated into playback speed determination program 106, playback speed determination program 106 generates the segmentation.

Playback speed determination program 106 extracts a segment (step 214). In an embodiment, responsive to segmenting the media file, playback speed determination program 106 extracts a segment of the media file for processing.

Playback speed determination program 106 generates an eigenvector and an eigenvalue associated with the segment (step 216). In an embodiment, playback speed determination program 106 uses eigenvector generation module 110 to generate an eigenvector and associated eigenvalue for the extracted segment. The process of eigenvector generation module 110 generating an eigenvector and associated eigenvalue will be discussed in further detail with respect to FIG. 3. In an embodiment where the function of eigenvector generation module 110 is fully integrated into playback speed determination program 106, playback speed determination program 106 generates the eigenvector and eigenvalue.

Playback speed determination program 106 determines whether there is an additional segment to analyze (decision block 218). If playback speed determination program 106 determines there is another segment to analyze ("yes" branch, decision block 218), then playback speed determination program 106 returns to step 214 to extract an additional segment. In an embodiment, playback speed determination program 106 iteratively repeats the eigenvector/ eigenvalue generation process until playback speed determination program 106 has generated eigenvectors and eigenvalues for all segments of the full media file.

If playback speed determination program 106 determines there is not another segment to analyze ("no" branch, decision block 218), then playback speed determination program 106 adds the generated eigenvectors and eigenvalues to the metadata of the full media file (step 220). In an embodiment, responsive to generating an eigenvector and associated eigenvalue for all segments of the full media file, playback speed determination program 106 adds the generated eigenvectors/eigenvalues to the metadata of the full media file stored in media database 114.

If playback speed determination program 106 determines the metadata does include eigenvectors ("yes" branch, decision block 204), then playback speed determination program 106 imports consumed media data (step 208). In an embodiment, if the metadata of the consumed media file includes one or more eigenvectors, then playback speed determination program 106 imports the output of consumed media tracking module 122 from user profile database 112. As described earlier, the output of consumed media tracking module 122 is data that describes any actions the user took regarding the media while consuming the media. For example, the consumed media data includes which segments of the media file the user consumed. In another example, the consumed media data may include timestamps of segments of a video the user viewed when the user fast forwarded through a portion or backed up to view a portion a second time. In an embodiment where consumed media tracking module 122 has access to additional inputs, such as a camera and/or a fitness device associated with the user, the consumed media data generated by consumed media data tracking module 122 may include other actions the user took during the time when the user consumed the media. For example, the consumed media data may include eye tracking data that indicates the user was distracted from the media for a period of time.

Playback speed determination program 106 extracts eigenvectors and eigenvalues associated with consumed segments (step 210). In an embodiment, based on the consumed media data, playback speed determination program 106 extracts eigenvectors and associated eigenvalues from the metadata associated with the segments of the media file that the user consumed from media database 114.

Playback speed determination program 106 adds the extracted eigenvectors and eigenvalues to the user profile (step 222). In an embodiment, playback speed determination program 106 adds the new eigenvectors and associated eigenvalues to the user profile in user profile database 112. Once the new eigenvectors and eigenvalues are added to the user profile, playback speed determination program 106 can use them to determine a preferred playback speed for a new media file, such that playback speed determination program 106 selects playback speeds for each segment specific to the user that is about to consume the media, as will be discussed in further detail with respect to FIG. 4. In an embodiment, playback speed determination program 106 decrements the eigenvalues over time with a decay factor if the user has not consumed any similar content. In an embodiment, as will be discussed in further detail with respect to FIG. 3, playback speed determination program 106 may alter the weights associated with consumed segments prior to adding the extracted eigenvectors and eigenvalues to the user profile.

In an embodiment, after playback speed determination program 106 adds the eigenvectors to the user profile, playback speed determination program 106 can determine whether there are other eigenvectors in the user profile that are within a threshold similarity of any of the newly added eigenvectors. If playback speed determination program 106 finds a match, i.e., a previously stored eigenvector that is within a threshold of similarity to a newly added eigenvector, then playback speed determination program 106 adds the value of the existing eigenvalue to the value of the newly added eigenvalue, creating a new eigenvalue for the previously stored eigenvector. If playback speed determination program 106 does not find a matching eigenvector, then playback speed determination program 106 simply adds the new eigenvector and associated eigenvalue to the user profile. In an embodiment, playback speed determination program 106 uses one or more known techniques to determine whether an eigenvalue match is present. For example, playback speed determination program 106 may use a Euclidian distance calculation, an angle between vectors, a Davis-Kahan theorem, etc.

Figure 3:
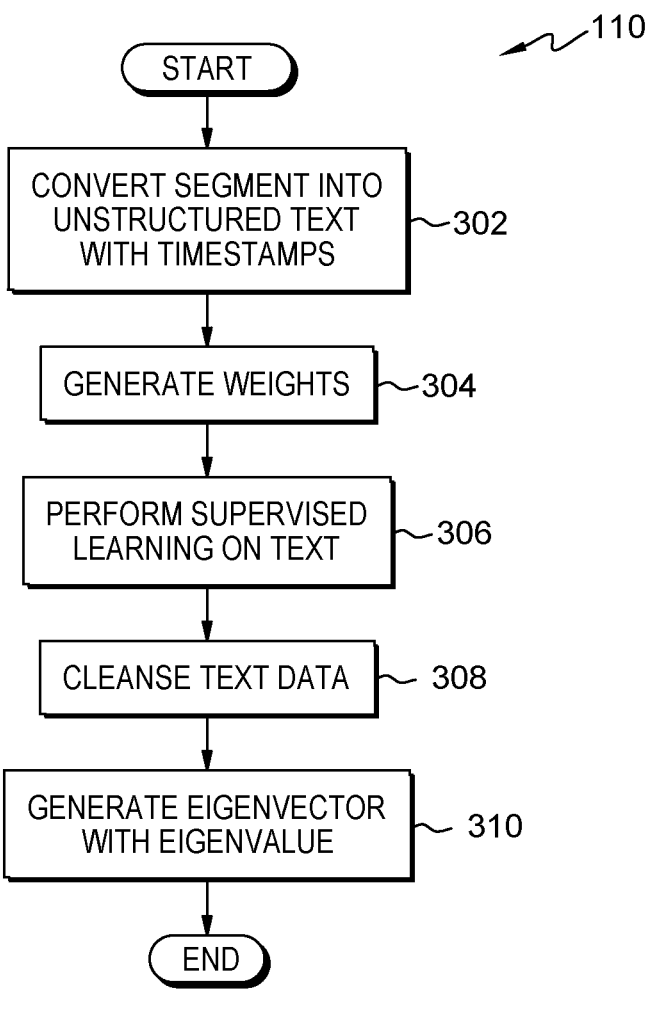
FIG. 3 is a flowchart depicting operational steps of an eigenvector generation module included in the playback speed determination program, on the server computer within the distributed data processing environment of FIG. 1, for generation of eigenvectors and eigenvalues associated with the media file, in accordance with an embodiment of the present invention.

FIG. 3 is a flowchart depicting operational steps of eigenvector generation module 110 included in playback speed determination program 106, on server computer 104 within distributed data processing environment 100 of FIG. 1, for generation of eigenvectors and eigenvalues associated with the media file, in accordance with an embodiment of the present invention.

Eigenvector generation module 110 converts the segment into unstructured text with timestamps (step 302). In an embodiment, responsive to playback speed determination program 106 extracting a segment from the segmented media file, as discussed with respect to step 214 of FIG. 2, eigenvector generation module 110 converts the segment of the media file into unstructured text with timestamps. Eigenvector generation module 110 can use timestamps to determine the talking speed of the presenter within the media by counting the number of words in a given time sample. Timestamps and determining the talking speed of the presenter are important to the process of generating an eigenvector because the user may speed up a playback rate due to the presenter being a slow talker versus increasing the playback rate because the user is already familiar with the content. For example, a user may play media at 1.5 times the actual talking speed if the presenter is speaking at 100 words per minute (wpm) even if the content is new to them, whereas if the same content were presented by a speaker at 150 wpm, the user would consume the media at the actual talking speed. In an embodiment where the segment includes audio data, eigenvector generation module 110 may use an API to extract text from the audio, as would be recognized by a person of skill in the art. In an embodiment, eigenvector generation module 110 may use one or more other APIs to extract other features from the segment that may impact a user's decision of playback speed. For example, if the presenter is speaking in a language that is not the native language of the user, then the user may use a slower playback speed in an effort to better understand the presented content. In another example, if the presenter is speaking in an accent that the user finds difficult to understand, then the user may decrease the playback speed. In a further example, the user may slow the playback speed if the audio quality is poor. In an embodiment where the segment includes visual data (e.g., a teacher writing notes on a whiteboard, a presentation shared during a meeting, etc.), eigenvector generation module 110 may use an API to extract text and images from the video, as would be recognized by a person of skill in the art.

Eigenvector generation module 110 generates weights (step 304). In an embodiment, eigenvector generation module 110 generates weights that are applied to the unstructured text as a precursor to generating an eigenvector for the segment. In an embodiment, eigenvector generation module 110 generates weights based on analysis of the metadata of the media segment. In an embodiment, eigenvector generation module 110 analyzes the text and/or metadata using one or more NLP techniques to identify one or more tokens, i.e., words, characters, subwords, or sentences extracted from the media, with an associated rate of occurrence, as would be recognized by a person of skill in the art. For example, eigenvector generation module 110 may generate weights based on the occurrences of a token, a correlation between a group of tokens, a correlation between a token or group of tokens and a correlating textbook chapter or section title, talking speed of the presenter, etc. In another embodiment, eigenvector generation module 110 generates weights for previously consumed media segments based on the speed at which the user watched the segment, whether the user repeated/replayed a portion or all of a segment, whether the user skipped a portion or all of the segment, the correlation between a token or group of tokens and the user's job role and/or social networking profile, the correlation between a token or group of tokens and other content the user has created and/or viewed (e.g., presentations, documents, meeting transcripts, and other files). In an embodiment, eigenvector generation module 110 takes the user's preferred presenter talking speed for different types of content into account when generating weights. In an embodiment, eigenvector generation module 110 stores the generated weights in media database 114.

Eigenvector generation module 110 performs supervised learning on the text (step 306). In an embodiment, eigenvector generation module 110 performs supervised machine learning, as would be recognized by a person of skill in the art, on the unstructured text of the media segment to classify the text using the previously generated weights. The classifier can take text/tokens as input, analyze its content, and automatically assign relevant tags. Eigenvector generation module 110 may use classification algorithms such as Naïve Bayes, support vector machines, or convolutional neural networks. In an embodiment, eigenvector generation module 110 uses an inductive bias learning algorithm to perform the supervised learning. In the embodiment, the inductive bias is the set of assumptions used to predict outputs of given inputs that have not previously been encountered. In an embodiment, eigenvector generation module 110 selects different activation functions for use in the supervised learning based on the nature of the media segment. For example, eigenvector generation module 110 may select a soft cosine function if the content of the segment is specific to a single topic, such as a one-minute video on a single topic. In another example, eigenvector generation module 110 may select a cosine function if the content of the segment covers many different facets, such as a segment that is twelve minutes long and brings together many smaller concepts in order to convey a larger topic.

Eigenvector generation module 110 cleanses the text data (step 308). In an embodiment, eigenvector generation module 110 cleanses the unstructured text data of the media segment, as would be recognized by a person of skill in the art. For example, cleansing may include stemming, i.e., altering the text such that it can be combined, such as changing a plural version of a word to a singular version of the word in order to account for the frequency that the word appears in the text. Other examples of cleansing operations include, but are not limited to, synonym analysis, Word2Vec, cosine, k-means, and Jaccardian indexing. In one embodiment, eigenvector generation module 110 cleanses the text data prior to generating the weights at step 304 instead of subsequent to performing supervised learning in step 306. In another embodiment, eigenvector generation module 110 cleanses the data both prior to step 304 and subsequent to step 306.

Eigenvector generation module 110 generates an eigenvector and eigenvalue for the segment (step 310). In an embodiment, based on the output of the supervised learning, eigenvector generation module 110 generates an eigenvector and associated eigenvalue for the media segment. In an embodiment, eigenvector generation module 110 uses one or more known techniques for generating the eigenvector and eigenvalue. The eigenvector and corresponding eigenvalue reduce the dimensionality of the media segment by creating a multidimensional vector of principal components that characterize the media segment while retaining most of the original information.

Figure 4:
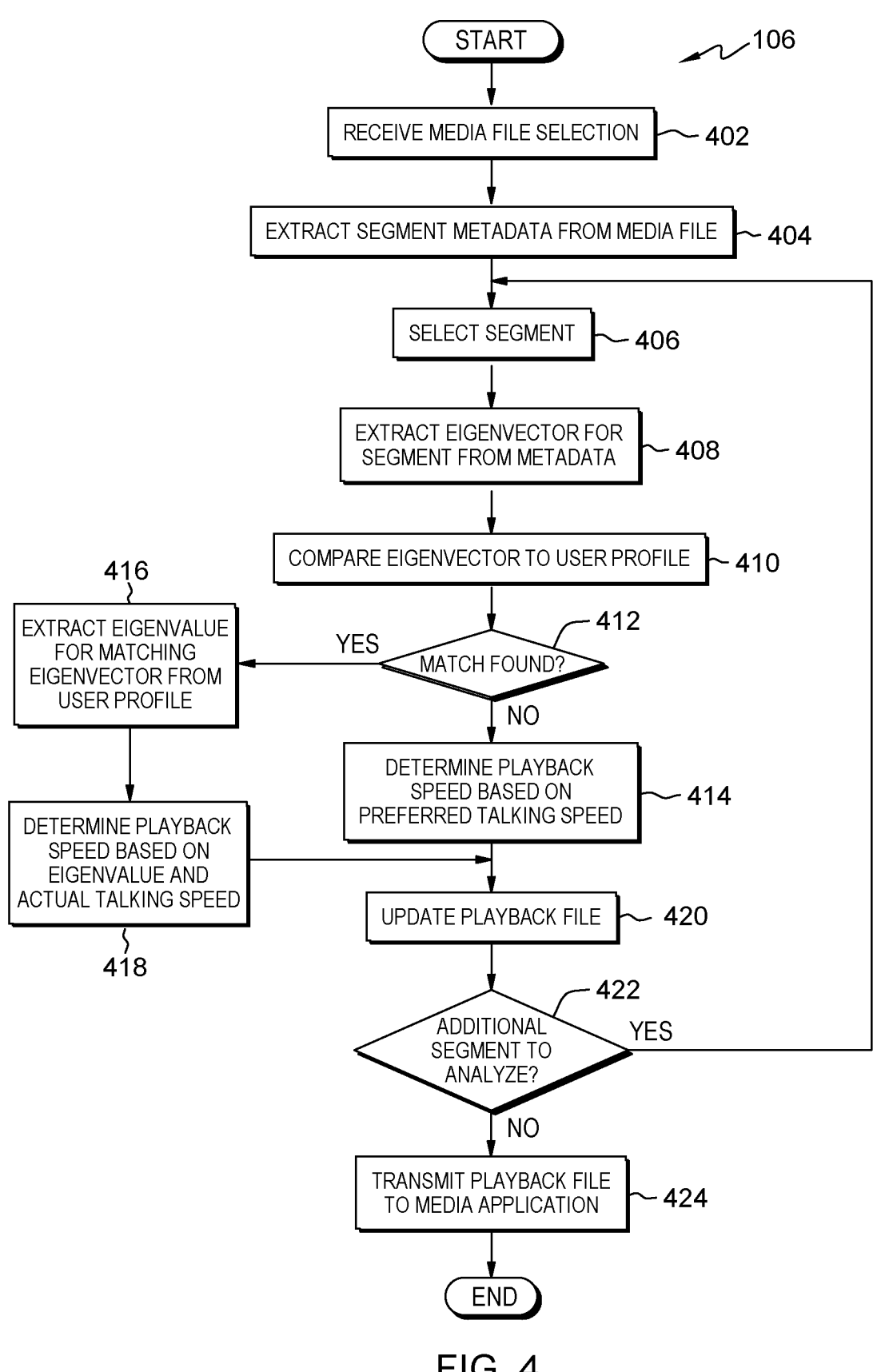
FIG. 4 is a flowchart depicting operational steps of the playback speed determination program, on the server computer within the distributed data processing environment of FIG. 1, for dynamic playback speed adjustment, in accordance with an embodiment of the present invention.

FIG. 4 is a flowchart depicting operational steps of playback speed determination program 106, on server computer 104 within distributed data processing environment 100 of FIG. 1, for dynamic playback speed adjustment, in accordance with an embodiment of the present invention.

Playback speed determination program 106 receives a media file selection (step 402). In an embodiment, when a user of client computing device 116 navigates to media application 118 and selects a piece of media that the user wishes to consume, playback speed determination program 106 receives the new media file selection. For example, a user may select a media file the user has not previously consumed. In another example, the user may select a media file that the user previously consumed but wants to consume again. In yet another example, the user may have consumed the file previously, but did not consume all of the segments of the media file. In an embodiment, media application 118 communicates the selection made by the user to playback speed determination program 106. In an embodiment, playback speed determination program 106 retrieves the new media selection from media database 114. In an embodiment, the user of client computing device 116 has opted in to using playback speed determination program 106 via playback speed user interface 120.

Playback speed determination program 106 extracts segment metadata from the media file (step 404). In an embodiment, playback speed determination program 106 extracts metadata of each segment of the selected media file. As discussed earlier, metadata associated with a segment of the media file may include, but is not limited to, comments, timestamps associated with the beginning and end of each segment of the file, a title of each segment of the file, eigenvectors and associated eigenvalues of each segment of the file, and consumed media data output by consumed media tracking module 122.

Playback speed determination program 106 selects a segment (step 406). In an embodiment, playback speed determination program 106 selects one segment of the media file to analyze. In one embodiment, playback speed determination program 106 selects the segments in chronological order, based on the timestamps included in the metadata. In another embodiment, playback speed determination program 106 selects the segments in a different order. For example, playback speed determination program 106 may select the segment by size or length, selecting a five-minute segment first, followed by a segment of equal or less time.

Playback speed determination program 106 extracts an eigenvector for the segment from the segment metadata (step 408). In an embodiment, playback speed determination program 106 analyzes each media file as the file is uploaded to media application 118 and/or stored in media database 114 such that eigenvectors for each segment already exist in the media file metadata, as discussed with respect to FIG. 2. In an embodiment, playback speed determination program 106 extracts the existing eigenvector associated with the selected media file segment from the previously extracted metadata.

Playback speed determination program 106 compares the extracted eigenvector to a user profile (step 410). In an embodiment, playback speed determination program 106 compares the eigenvector previously extracted from the segment metadata to eigenvectors stored in user profile database 112. As discussed with respect to FIG. 2, playback speed determination program 106 has previously added eigenvectors associated with consumed media segments to the user profile stored in user profile database 112. Playback speed determination program 106 compares the extracted eigenvector associated with the new media file segment to one or more eigenvectors associated with media file segments that the user has previously consumed in order to determine similarity between them and find a potential match. In an embodiment, playback speed determination program 106 uses one or more known techniques to determine similarity between the eigenvectors. For example, playback speed determination program 106 may use a Euclidian distance calculation, an angle between vectors, a Davie-Kahan theorem, etc.

Playback speed determination program 106 determines whether a match is found (decision block 412). In an embodiment, playback speed determination program 106 determines whether the value of the similarity of the eigenvectors exceeds a threshold value of similarity to determine whether the eigenvectors match. In an embodiment, the threshold is dependent on which technique playback speed determination program 106 uses to determine similarity. A match between eigenvectors indicates that similar topics from the new media file have already been consumed by the user in other media files. In an embodiment, playback speed determination program 106 may use partial eigenvector matches by dropping some parameters within the multidimensional eigenvector. By removing parameters before comparing eigenvectors between content and user profile, there is a better chance of the vectors aligning which signifies a match to a broader topic. In another embodiment, instead of dropping parameters from the eigenvector, playback speed determination program 106 increases the threshold distance allowed between eigenvectors of the content and user profile (e.g., if using Euclidian distances to compare vectors, the threshold distance for signifying a match could be larger).

If playback speed determination program 106 determines a match is found ("yes" branch, decision block 412), then playback speed determination program 106 extracts the associated eigenvalue from the user profile (step 416). In an embodiment, if playback speed determination program 106 finds a match between the current eigenvector and an eigenvector associated with media the user has previously consumed, then playback speed determination program 106 extracts the eigenvalue associated with the matching eigenvector from the user profile in user profile database 112.

Playback speed determination program 106 determines the playback speed based on the eigenvalue and the actual talking speed in the segment of the media (step 418). In an embodiment, playback speed determination program 106 determines the rate at which the user prefers the current segment of the newly selected media file to be played back based on the extracted eigenvalue and on the actual talking speed of the presenter in the media segment. In an embodiment, playback speed determination program 106 performs a linear correlation between the eigenvalue and the actual talking speed of the presenter and places an upper bound on the fastest talking speed the user prefers once the eigenvalue reaches a threshold level. In an embodiment, playback speed determination program 106 performs a linear correlation between eigenvalues by applying a normalizing factor to the two eigenvalues being compared. In the embodiment, one parameter of the eigenvector is the number of times a token is mentioned in the segment. If the typical talking speed the user has experienced on a specific topic is 80 words per minute (wpm) and the current content has 120 wpm, then the number of times a token is mentioned may not match simply because of the difference in talking speed. Playback speed determination program 106 can perform a linear correlation to multiply the number of tokens in the new content by ⅔ such that the content itself can be better compared to the user profile.

In an embodiment, playback speed determination program 106 may dynamically select different speeds for a given segment based on an activity the user is performing while consuming the media. For example, playback speed determination program 106 may determine a slower playback speed for a media segment if playback speed determination program 106 determines, via consumed media tracking module 122, that the user is performing physical activity, such as exercising, at the time the user consumes the media segment, and therefore is somewhat distracted. However, playback speed determination program 106 may determine a faster playback speed for the same segment if playback speed determination program 106 determines, via consumed media tracking module 122, that the user is focused on a screen of client computing device 116 while consuming the media segment.

If playback speed determination program 106 determines a match is not found ("no" branch, decision block 412), then playback speed determination program 106 determines the playback speed based on the preferred talking speed of the user (step 414). In an embodiment where playback speed determination program 106 does not find a match between the current eigenvector and an eigenvector associated with media the user has previously consumed, then playback speed determination program 106 determines the playback speed for the segment is the preferred talking speed across a plurality of media consumed by the user in the past. Playback speed determination program 106 may speed up or slow down the actual talking speed in the media to meet the user preference. In an embodiment, playback speed determination program 106 determines the preferred talking speed based on actual speeds with which the user consumed media in the past, i.e., learning the user preferences over time. In another embodiment, playback speed determination program 106, extracts the playback speed from user preferences stored in the user profile in user profile database 112. In yet another embodiment, playback speed determination program 106 determines the preferred talking speed based on an activity the user is performing while consuming the media, as discussed above. In an embodiment, preferred talking speeds may be topic dependent. For example, for math classes, the user may typically consume media at a slower talking speed than history classes. In an embodiment, playback speed determination program 106 may determine the topic by a partial eigenvector match that uses a lower threshold.

Responsive to determining the playback speed of the segment, playback speed determination program 106 updates a playback file (step 420). In an embodiment, responsive to determining the playback speed of the media segment, whether based on preferred talking speed, actual talking speed, or eigenvectors and associated eigenvalues, playback speed determination program 106 updates a playback file that describes the determined playback speed for each segment of the media file. In an embodiment where playback speed determination program 106 is analyzing a first segment of the media file, playback speed determination program 106 generates a new playback file. In an embodiment where multiple users are consuming the same media together on the same device, playback speed determination program 106 determines the slowest playback speed among all the users and updates the playback file with the slowest playback speed.

Playback speed determination program 106 determines whether there is an additional segment to analyze (decision block 422). In an embodiment, playback speed determination program 106 iteratively processes each segment in the media file to determine a preferred playback speed for each segment. If playback speed determination program 106 determines there is an additional segment to analyze ("yes" branch, decision block 422), then playback speed determination program 106 returns to step 406 to extract an additional segment.

If playback speed determination program 106 determines there is no additional segment to analyze ("no" branch, decision block 422), then playback speed determination program 106 transmits the playback file to media application 118 (step 424). In an embodiment, playback speed determination program 106 transmits the playback file to media application 118 such that media application 118 plays each segment of the media at the determined playback speed with reference to the playback file. By doing so, the user can consume the media content at a rate that is dynamically adjusted for the user's comfort and ease of comprehension.

In an example scenario, a student watches a recorded video lesson for a college course. The one-hour lesson has six segments. The first segment is a recap of the previous two lessons. Since the user already viewed the previous lesson, playback speed determination program 106 determines the playback speed for the first segment is 1.5 times the actual talking speed due to existing eigenvectors and eigenvalues in the user's profile. For the next three segments, the content is new to the user, but the user feels the professor generally speaks very slowly, so playback speed determination program 106 determines that the playback speed for these segments is 1.1 times the actual talking speed. The last two segments cover content that the user has consumed in the past and corresponding eigenvectors and eigenvalues are already present in the user profile, so playback speed determination program 106 determines that the playback speed for these segments is 1.25 times the actual talking speed. By playing the media at different rates, the user can consume the entire media in a shorter amount of time without missing any new content.

Figure 5:
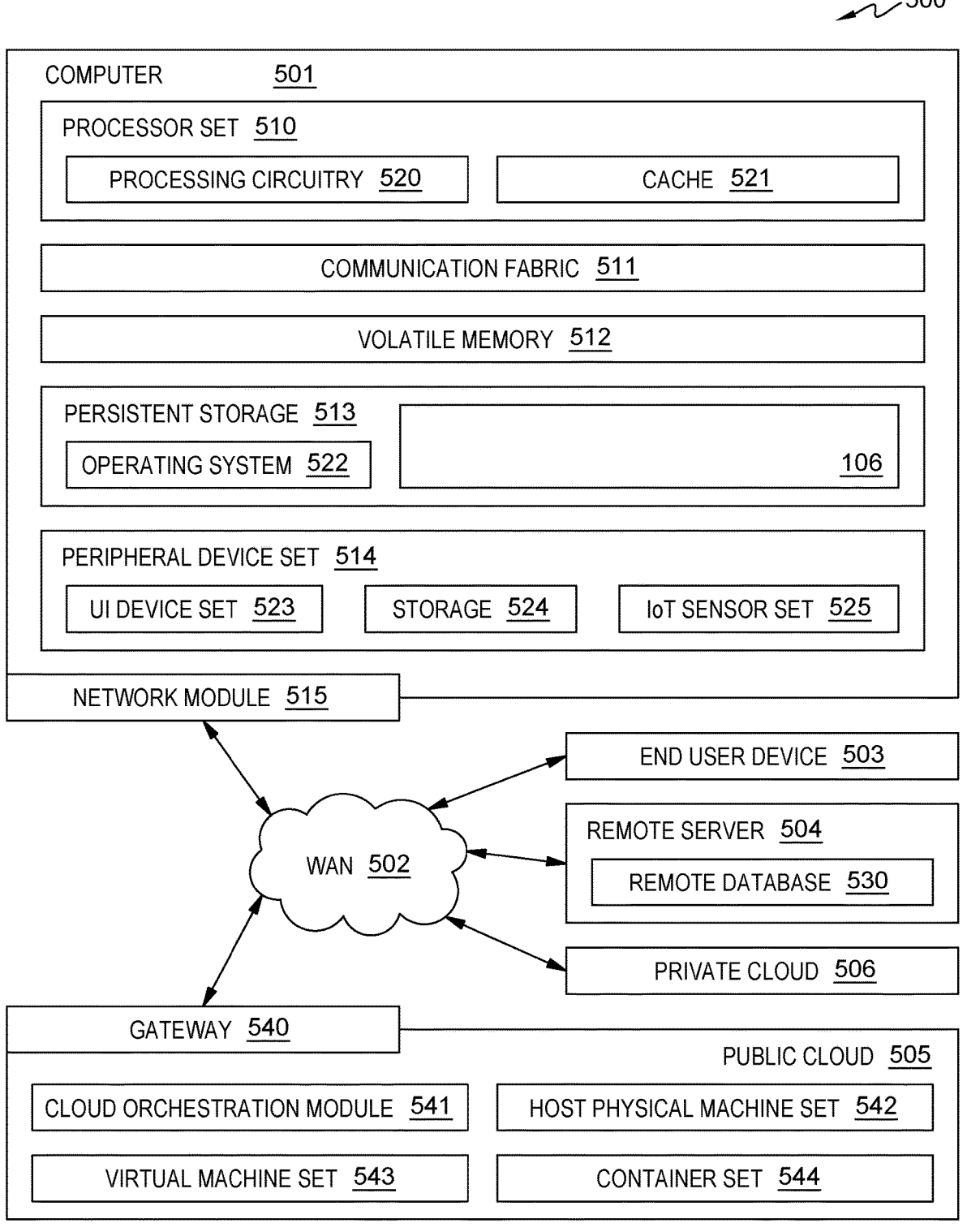
FIG. 5 depicts a block diagram of components of the server computer executing the playback speed determination program within the distributed data processing environment of FIG. 1, in accordance with an embodiment of the present invention.

FIG. 5 depicts a block diagram of components of server computer 104 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Computing environment 500 contains an example of an environment for the execution of at least some of the computer code involved in performing the inventive methods, such as playback speed determination program 106 for dynamic playback speed adjustment. In addition to playback speed determination program 106, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and playback speed determination program 106, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/ or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 1. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 5 user 10 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in playback speed determination program 106 in persistent storage 513.

Communication fabric 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface type operating systems that employ a kernel. The code included in playback speed determination program 106 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501) and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   extracting, by one or more computer processors, metadata from a media file previously consumed by a user;
   determining, by one or more computer processors, the metadata includes an eigenvector associated with each segment of the media file;
   importing, by one or more computer processors, data associated with actions taken by the user while the user consumed the media file;
   based on the data associated with the actions taken by the user while the user consumed the media file, extracting, by one or more computer processors, the eigenvector and an associated eigenvalue of each previously consumed segment of the media file from the data associated with actions taken by the user while the user consumed the media file; and
   adding, by one or more computer processors, the eigenvector and the associated eigenvalue of each previously consumed segment of the media file to a user profile.

2. The computer-implemented method of claim 1, further comprising:
   determining, by one or more computer processors, the metadata does not include the eigenvector associated with each segment of the media file;
   importing, by one or more computer processors, a full media file associated with the extracted metadata;
   dividing, by one or more computer processors, the full media file into two or more segments;
   extracting, by one or more computer processors, a first segment of the two or more segments;
   generating, by one or more computer processors, a first eigenvector and an associated first eigenvalue associated with the first segment; and
   adding, by one or more computer processors, the first eigenvector and the associated first eigenvalue to metadata of the full media file.

3. The computer-implemented method of claim 2, wherein generating the first eigenvector and the associated first eigenvalue associated with the first segment further comprises:
   converting, by one or more computer processors, the first segment into unstructured text with associated timestamps;
   generating, by one or more computer processors, one or more weights associated with the unstructured text;

performing, by one or more computer processors, supervised learning on the unstructured text based on the generated one or more weights;

cleansing, by one or more computer processors, data associated with the unstructured text; and based on the supervised learning, generating, by one or more computer processors, the first eigenvector and the associated first eigenvalue associated with the first segment.

4. The computer-implemented method of claim 3, wherein the generated one or more weights associated with the unstructured text are based on one or more of: an occurrence of a token, a correlation between a group of tokens, a correlation between at least one token and a textbook chapter, a correlation between at least one token and a section title, a talking speed of a presenter, a speed at which the user consumed the first segment, whether the user replayed a portion the first segment, whether the user skipped a portion of the first segment, a correlation between at least one token and a job role of the user, a correlation between at least one token and a social networking profile of the user, a correlation between at least one token and other content the user has created.

5. The computer-implemented method of claim 1, further comprising:

receiving, by one or more computer processors, a selection of a first media file from the user;

extracting, by one or more computer processors, metadata associated with each segment of the first media file;

selecting, by one or more computer processors, a first segment of the first media file;

extracting, by one or more computer processors, a first eigenvector from the metadata associated with the first segment of the first media file;

comparing, by one or more computer processors, the extracted first eigenvector to one or more eigenvectors in the user profile;

determining, by one or more computer processors, whether the extracted first eigenvector matches one of the one or more eigenvectors in the user profile;

extracting, by one or more computer processors, from the user profile, an eigenvalue associated with a matching eigenvector;

determining, by one or more computer processors, a playback speed for the first segment based on the eigenvalue and an actual talking speed of a presenter in the first segment;

generating, by one or more computer processors, a playback file, wherein the playback file includes the playback speed; and transmitting, by one or more computer processors, the playback file to a media application with which the user consumes the first media file.

6. The computer-implemented method of claim 5, further comprising:

determining, by one or more computer processors, the extracted first eigenvector does not match one of the one or more eigenvectors in the user profile; and determining, by one or more computer processors, the playback speed for the first segment based on a preferred talking speed in the user profile.

7. The computer-implemented method of claim 5, wherein determining whether the extracted first eigenvector matches one of the one or more eigenvectors in the user profile further comprises:

determining, by one or more computer processors, whether the extracted first eigenvector is within a threshold of similarity to the one of the one or more eigenvectors in the user profile.

8. A computer program product comprising:

one or more computer readable storage media and program instructions collectively stored on the one or more computer readable storage media, the stored program instructions comprising:

program instructions to extract metadata from a media file previously consumed by a user;

program instructions to determine the metadata includes an eigenvector associated with each segment of the media file;

program instructions to import data associated with actions taken by the user while the user consumed the media file;

based on the data associated with the actions taken by the user while the user consumed the media file, program instructions to extract the eigenvector and an associated eigenvalue of each previously consumed segment of the media file from the data associated with actions taken by the user while the user consumed the media file; and program instructions to add the eigenvector and the associated eigenvalue of each previously consumed segment of the media file to a user profile.

9. The computer program product of claim 8, the stored program instructions further comprising:

program instructions to determine the metadata does not include the eigenvector associated with each segment of the media file;

program instructions to import a full media file associated with the extracted metadata;

program instructions to divide the full media file into two or more segments;

program instructions to extract a first segment of the two or more segments;

program instructions to generate a first eigenvector and an associated first eigenvalue associated with the first segment; and program instructions to add the first eigenvector and the associated first eigenvalue to metadata of the full media file.

10. The computer program product of claim 9, wherein the program instructions to generate the first eigenvector and the associated first eigenvalue associated with the first segment comprise:

program instructions to convert the first segment into unstructured text with associated timestamps;

program instructions to generate one or more weights associated with the unstructured text;

program instructions to perform supervised learning on the unstructured text based on the generated one or more weights;

program instructions to cleanse data associated with the unstructured text; and based on the supervised learning, program instructions to generate the first eigenvector and the associated first eigenvalue associated with the first segment.

11. The computer program product of claim 10, wherein the generated one or more weights associated with the unstructured text are based on one or more of: an occurrence of a token, a correlation between a group of tokens, a correlation between at least one token and a textbook chapter, a correlation between at least one token and a section title, a talking speed of a presenter, a speed at which the user consumed the first segment, whether the user replayed a portion the first segment, whether the user skipped a portion of the first segment, a correlation between at least one token and a job role of the user, a correlation between at least one token and a social networking profile of the user, a correlation between at least one token and other content the user has created.

12. The computer program product of claim 8, the stored program instructions further comprising:

program instructions to receive a selection of a first media file from the user;

program instructions to extract metadata associated with each segment of the first media file;

program instructions to select a first segment of the first media file;

program instructions to extract a first eigenvector from the metadata associated with the first segment of the first media file;

program instructions to compare the extracted first eigenvector to one or more eigenvectors in the user profile;

program instructions to determine whether the extracted first eigenvector matches one of the one or more eigenvectors in the user profile;

program instructions to extract, from the user profile, an eigenvalue associated with a matching eigenvector;

program instructions to determine a playback speed for the first segment based on the eigenvalue and an actual talking speed of a presenter in the first segment;

program instructions to generate a playback file, wherein the playback file includes the playback speed; and program instructions to transmit the playback file to a media application with which the user consumes the media file.

13. The computer program product of claim 12, the stored program instructions further comprising:

program instructions to determine the extracted first eigenvector does not match one of the one or more eigenvectors in the user profile; and program instructions to determine the playback speed for the first segment based on a preferred talking speed in the user profile.

14. The computer program product of claim 12, wherein the program instructions to determine whether the extracted first eigenvector matches one of the one or more eigenvectors in the user profile further comprises:

program instructions to determine whether the extracted first eigenvector is within a threshold of similarity to the one of the one or more eigenvectors in the user profile.

15. A computer system comprising:

one or more computer processors;

one or more computer readable storage media;

program instructions collectively stored on the one or more computer readable storage media for execution by at least one of the one or more computer processors, the stored program instructions comprising:

program instructions to extract metadata from a media file previously consumed by a user;

program instructions to determine the metadata includes an eigenvector associated with each segment of the media file;

program instructions to import data associated with actions taken by the user while the user consumed the media file;

based on the data associated with the actions taken by the user while the user consumed the media file, program instructions to extract the eigenvector and an associated eigenvalue of each previously consumed segment of the media file from the data associated with actions taken by the user while the user consumed the media file; and program instructions to add the eigenvector and the associated eigenvalue of each previously consumed segment of the media file to a user profile.

16. The computer system of claim 15, the stored program instructions further comprising:

program instructions to determine the metadata does not include the eigenvector associated with each segment of the media file;

program instructions to import a full media file associated with the extracted metadata;

program instructions to divide the full media file into two or more segments;

program instructions to extract a first segment of the two or more segments;

program instructions to generate a first eigenvector and an associated first eigenvalue associated with the first segment; and program instructions to add the first eigenvector and the associated first eigenvalue to metadata of the full media file.

17. The computer system of claim 16, wherein the program instructions to generate the first eigenvector and the associated first eigenvalue associated with the first segment comprise:

program instructions to convert the first segment into unstructured text with associated timestamps;

program instructions to generate one or more weights associated with the unstructured text;

program instructions to perform supervised learning on the unstructured text based on the generated one or more weights;

program instructions to cleanse data associated with the unstructured text; and based on the supervised learning, program instructions to generate the first eigenvector and the associated first eigenvalue associated with the first segment.

18. The computer system of claim 15, the stored program instructions further comprising:

program instructions to receive a selection of a first media file from the user;

program instructions to extract metadata associated with each segment of the first media file;

program instructions to select a first segment of the first media file;

program instructions to extract a first eigenvector from the metadata associated with the first segment of the first media file;

program instructions to compare the extracted first eigenvector to one or more eigenvectors in the user profile;

program instructions to determine whether the extracted first eigenvector matches one of the one or more eigenvectors in the user profile;

program instructions to extract, from the user profile, an eigenvalue associated with a matching eigenvector;

program instructions to determine a playback speed for the first segment based on the eigenvalue and an actual talking speed of a presenter in the first segment;

program instructions to generate a playback file, wherein the playback file includes the playback speed; and program instructions to transmit the playback file to a media application with which the user consumes the media file.

19. The computer system of claim 18, the stored program instructions further comprising:

program instructions to determine the extracted first eigenvector does not match one of the one or more eigenvectors in the user profile; and program instructions to determine the playback speed for the first segment based on a preferred talking speed in the user profile.

20. The computer system of claim 18, wherein the program instructions to determine whether the extracted first eigenvector matches one of the one or more eigenvectors in the user profile further comprises:

program instructions to determine whether the extracted first eigenvector is within a threshold of similarity to the one of the one or more eigenvectors in the user profile.

\* \* \* \* \*